May 13, 1952 — E. VAN HAAFTEN — 2,596,449

SHOCK ABSORBING WATCH BEARING

Filed Aug. 23, 1949 — 2 SHEETS—SHEET 1

Inventor
EGBERT VAN HAAFTEN
By
M. W. Gould
ATTORNEY

May 13, 1952 E. VAN HAAFTEN 2,596,449
SHOCK ABSORBING WATCH BEARING
Filed Aug. 23, 1949
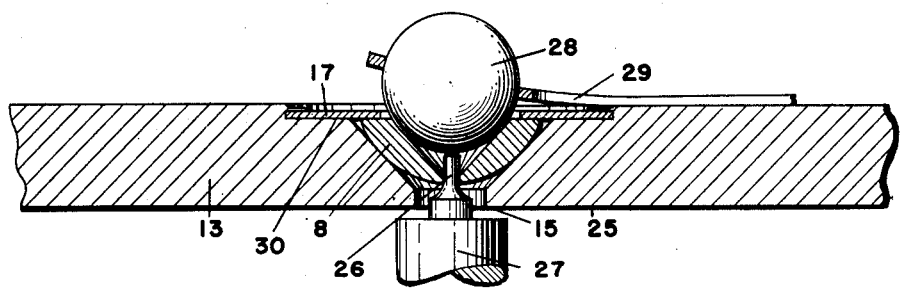
FIG. 4
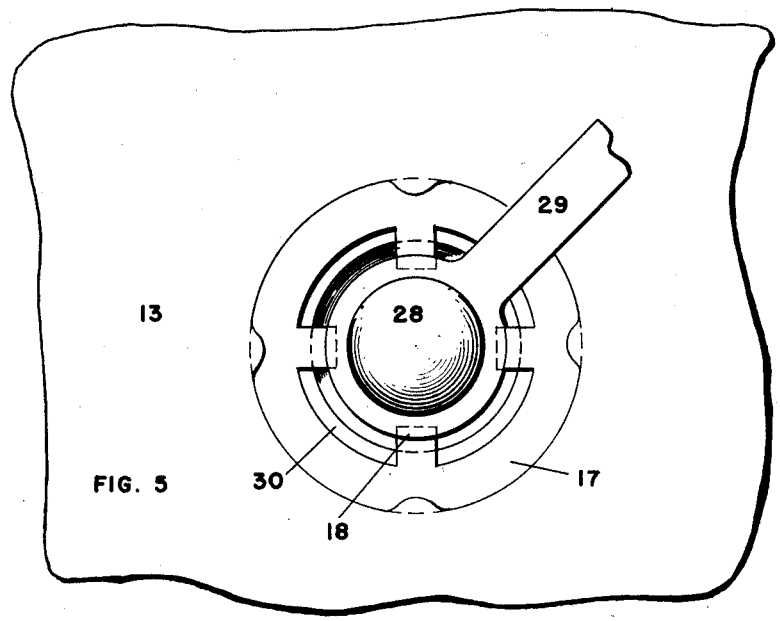
FIG. 5
FIG. 7 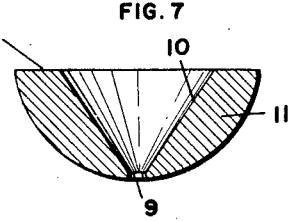 FIG. 6 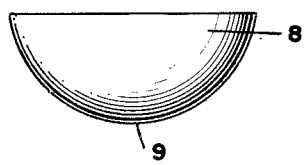
Inventor
EGBERT VAN HAAFTEN
By M. W. Gould
ATTORNEY Patented May 13, 1952

2,596,449

UNITED STATES PATENT OFFICE 2,596,449

SHOCK ABSORBING WATCH BEARING

Egbert Van Haaften, Lancaster Township, Lancaster County, Pa., assignor to Hamilton Watch Company, Lancaster, Pa.

Application August 23, 1949, Serial No. 111,790

8 Claims. (Cl. 58—140)

This invention is directed to a shock absorbing bearing particularly adapted for the balance staff of a horological instrument.

It is the object of the present invention to provide a combination radial and thrust bearing of semispherical shape which has a spherical outward conformation and a conical inner conformation designed to have universal movement in a conical depression with means adapted to maintain said jeweled bearing in a desired position.

It is an object of the present invention to provide a bearing for a balance staff pivot which will function both as a radial and thrust bearing, which is universally movable under shocks from any direction and which will return to normal position immediately.

A further object of the present invention is to provide a radial and thrust bearing of external spherical shape and internal conical shape.

A further object of the invention is to provide springs which will yield under shock or impact and through pressure on the rim of the bearing return the bearing to proper position.

A further object of the present invention is to provide olived hole radial bearing adapted to bear against the shoulder of a balance staff to serve simultaneously as a thrust bearing.

A still further object of the present invention is to provide a bearing having external spherical shape and an internal conical shaped lubricant receiving pit.

A still further object of the present invention is to provide a semispherical shell having a center olived hole opening serving as a radial and thrust bearing and means bearing against the section of the shell to return the shell to proper position after distortion through shock.

With the foregoing and other objects in view, the invention resides in the novel arrangement and combination of parts and in the details of construction hereinafter described nd claimed, it being understood that changes in the precise embodiment of the invention herein described may be made within the scope of what is claimed without departing from the spirit of the invention.

The invention is illustrated in the accompanying drawings in which:

Figure 4 shows a modification to be used with a different type of balance staff in which the spherical bearing serves only as a radial bearing, an endstone in the form of a sphere being provided.

Figure 5 is a top plan view of the modification shown in Figure 4.

Figure 6 is an enlarged side elevation of the bearing.

Figure 7 is an enlarged cross sectional view of the bearing.

Referring particularly to Figures 6 and 7, the bearing 8 is of semispherical shape having an olived hole 9 located at its lowermost position. The interior of the bearing is cone shaped, as shown at 10, to provide strength for the bearing in the sides 11 and to permit the bearing to be rocked about the pivot of the balance staff to a considerable angle. The inward sloping conical sides provide a lubricant well in which the tendency of the oil is to feed toward the olived hole, while the thickened walls provide the horizontal surface 12 serving to receive the holding springs.

Figure 1:
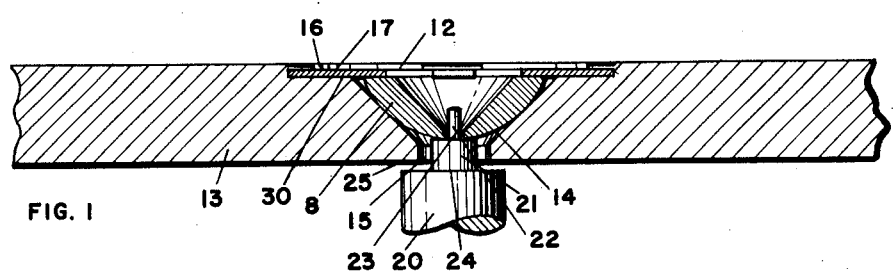
Figure 1 is a cross section showing the bearing in normal position.
Figure 2:
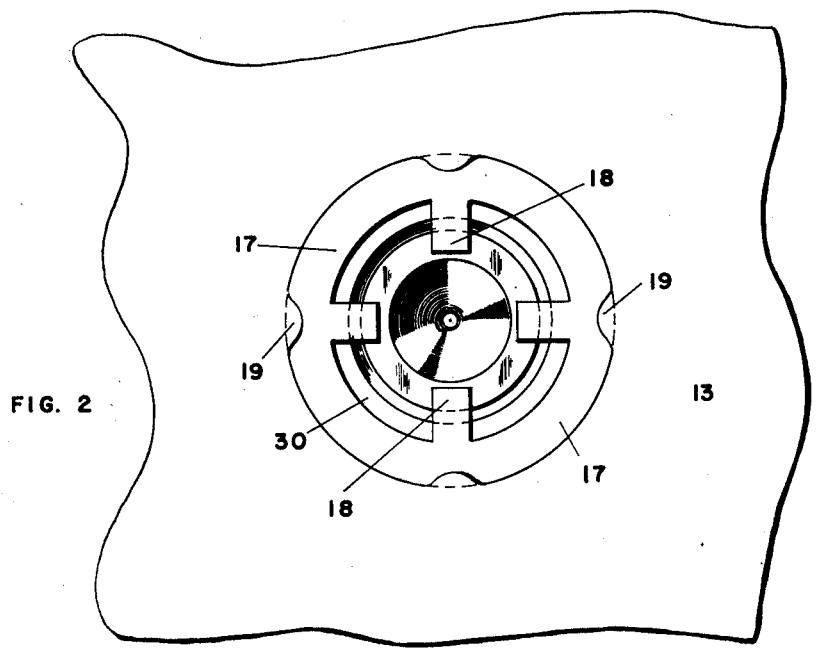
Figure 2 is a top plan view of the bearing.
Figure 3:
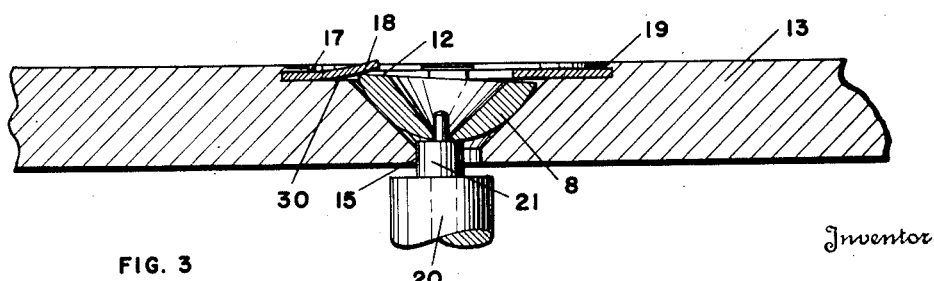
Figure 3 is a cross sectional view similar to Figure 1 showing the bearing in shock absorbing position.

Referring to Figures 1, 2 and 3 the bearing is shown mounted in a plate or bridge 13 which has a conical depression 14 terminating in a cylindrical hole 15. The upper side of the conical depression is enlarged to form a seat 16 for the spring 17.

This spring 17 is provided with four inward radial projecting fingers 18 which overlie the edge 12 of the bearing to securely hold the bearing in the conical depression. The circular spring 17 is securely held in the seat 16 by peening as at 19. The lips 18 of the spring bear against the plate at 30, thus providing a stop for the spring action when displaced by movement of the bearing.

The staff 20, of which only the upper end is here shown, is formed with a reduced collar 21 and a pivot 22. The end face 23 of the collar 21 bears against the spherical surface of the bearing adjacent the olived hole while the pivot 22 enters the olived hole and thus the bearing serves both as a thrust and a radial bearing. A definite clearance is maintained between the collar 21 and the wall 15, as well as between the end face 24 of the shaft and the lower side 25 of the plate. This clearance should be slightly less than the allowable movement of the bearing in any direction.

Referring particularly to Figure 3, the shaft 20 is shown in the position of shock having moved to the left so that the collar 21 has engaged the surface of the wall 15 and the bearing has rotated in the conical depression about an imaginary center so that the edge 12 forces the finger 18 of the spring 17 upward. This position is momentary, the spring 18 immediately returning the bearing to normal position in the conical depression and consequently returning the shaft and balance wheel to its normal position, the shock having been taken by the impact of the comparative strong collar 21 against the wall 15. In a similar manner movement in a direction longitudinal to the axis of the shaft 20 would be taken by engagement of the face 24 with the lower surface 25 of the plate 13, the bearing moving upward against the action of all four fingers 18 of the spring 17.

The spherical outward shape of the bearing permits universal movement in the conical depression thus providing means for preventing the breaking of the pivots of balance staffs due to slight sudden shock.

Referring to Figures 4 and 5, a modification adapted for use with a staff formed with the conventional pivot making it necessary to employ an endstone. In this instance the pivot 26 of the staff 27 extends into the olived hole of the jewel, thrust being taken by a spherical endstone 28 held in place by a spring 29. The seating of the bearing 8 and the spring 17 is exactly the same as when the bearing is used for both a radial and a thrust bearing. Shock transmitted to the balance staff 27 is still received on the side wall 15 or the bottom 25 of the plate 13. While this modification is shown with a spherical shaped endstone, it could be semispherical or any other desired shape which will fulfill the requirements of an endstone.

What is claimed is:

1. A combination integral radial and thrust bearing for the pivots of balance staffs having a semispherical shaped outer surface and a conical shaped inner surface, the bearing being formed with an olived hole at the apex of the conical surface to serve as a radial bearing, the outer edges of the spherical surface adjacent the olived hole engaging a shoulder of the balance staff to serve as a thrust bearing.

2. The combination of a mounting for a watch bearing comprising a plate formed with a conical depression extended into a cylindrical opening and a semispherical integral combination radial and thrust bearing mounted in said conical depression for universal motion within predetermined limits, said bearing maintaining constant line contact with said conical depression.

3. A bearing mounting for watches comprising a plate formed with a conical depression extending into a cylindrical opening, the plate at the larger end of the conical depression being formed with a circular recess, a semispherical bearing mounted for universal movement in said conical depression, means carried wholly within said recess and engaging the diametrical edge of said semispherical bearing for retaining said bearing in said conical depression and restricting the movement of said bearing to within predetermined limits.

4. A bearing mounting for watches comprising a plate formed with a conical depression extending into a cylindrical opening, the plate being formed with a circular recess at the upper end of said conical depression, a semispherical bearing mounted in said conical depression for universal movement, a circular spring formed with inwardly extending lips carried wholly within said recess, the lips extending over and engaging the diametrical edge of said semispherical bearing, the spring lips being deformable under movement of the bearing.

5. A bearing mounting for watches comprising a plate formed with a conical depression extending into a cylindrical opening, said plate being formed with a circular recess at the upper end of the conical depression, a semispherical bearing formed with an olived pivot receiving hole mounted for universal movement in said conical depression, said olived hole being aligned with the cylindrical extension of said conical depression, a staff having a pivot pin extending through said cylindrical depression and received in said olived hole, a spring washer formed with inwardly extending lips carried in said circular recess, said lips extending over and engaging the diametrical edge of said semispherical bearing, whereby movement of the staff will rotate the bearing in the conical depression, deforming the spring lips a distance equal to the clearance between the staff and the cylindrical extension of the conical depression.

6. A bearing mounting according to claim 5 wherein the spring lips contacting the diametrical edge of the semispherical bearing bear against the recessed portion of the plate for a part of their length, said recessed portion serving as a stop to limit the spring movement of the lips.

7. An integral semispherical combination radial and thrust bearing for balance staff pivots, including a plate formed with a conical seat for receiving said bearing for universal movement, said bearing maintaining a constant circular line contact with said seat.

8. An integral semispherical combination radial and thrust bearing for the pivots of balance staffs formed with a semispherical shaped outer surface and a conical shaped inner surface, said surfaces being joined by an olived hole located at the apex of the conical surface, including a supporting plate formed with a conical seat, said bearing being mounted for movement within said conical seat and maintaining constant circular line contact with said seat in any position.

EGBERT VAN HAAFTEN.

REFERENCES CITED

The following references are of record in the file of this patent:

UNITED STATES PATENTS

| Number | Name | Date |
| --- | --- | --- |
| 1,976,181 | Marti | Oct. 9, 1934 |
| 2,015,905 | Marti | Oct. 1, 1935 |
| 2,146,329 | Coulomb | Feb. 7, 1939 |
| 2,184,580 | Coulomb | Dec. 26, 1939 |
| 2,372,972 | Morf | Apr. 3, 1945 |